United States Patent
Johnson

(10) Patent No.: US 6,633,008 B2
(45) Date of Patent: Oct. 14, 2003

(54) ELECTRONIC FORCE SENSING SHOCK RESISTANT LOAD CELL

(75) Inventor: Thomas Johnson, Winnebago, MN (US)

(73) Assignee: Weigh-Tronix, Inc., Fairmont, MN (US)

( * ) Notice: Subject to any disclaimer, the term of this patent is extended or adjusted under 35 U.S.C. 154(b) by 310 days.

(21) Appl. No.: 09/794,687

(22) Filed: Feb. 27, 2001

(65) Prior Publication Data

US 2002/0148652 A1 Oct. 17, 2002

(51) Int. Cl.[7] .......................... G01G 3/08; G01G 23/06; G01L 1/10
(52) U.S. Cl. .................. 177/184; 177/187; 177/188; 177/229; 73/862.622
(58) Field of Search .................... 177/184, 187, 177/188, 211, 229; 73/862.622, 862.634, 862.639

(56) References Cited

U.S. PATENT DOCUMENTS

| | | | |
|---|---|---|---|
| 3,712,395 A | 1/1973 | Streater et al. | 177/210 R |
| 4,043,190 A | 8/1977 | Gallo | 73/862.59 |
| 4,237,988 A | 12/1980 | Blawert et al. | 177/189 |
| 4,384,495 A | 5/1983 | Paros | 73/862.59 |
| 4,497,386 A * | 2/1985 | Meier | 177/229 |
| 4,838,369 A | 6/1989 | Albert | 177/210 FP |
| 5,191,949 A * | 3/1993 | Mills et al. | 177/229 |
| 5,313,023 A | 5/1994 | Johnson | 177/229 |
| 5,641,948 A * | 6/1997 | Burkhard | 177/229 |

* cited by examiner

*Primary Examiner*—Randy Gibson
(74) *Attorney, Agent, or Firm*—Gray Cary Ware & Freidenrich LLP

(57) ABSTRACT

The electronic load cell is for measuring force using a force sensor within and has reduced susceptibility to shock or impact in the direction of its measurement vector. The load cell device includes a load cell structure formed of a suitable solid and including vertically spaced apart, generally parallel horizontal elements integrally formed with longitudinally spaced apart, generally parallel vertical elements with flexible members. Flexures interconnect each horizontal element with the vertical elements. A force sensor is connected between the horizontal element connecting the two flexures on the first side of the parallelogram and a spring connected to the second parallel member. The reduced shock susceptibility is achieved by placing the center of mass of the movable end of the spring connected to the force sensor nearly at or at a distance from the plane defined by the flexing axis of the flexible members connecting the first perpendicular member such that the movement of this mass is not in the direction of the axis of sensitivity of the sensor.

26 Claims, 4 Drawing Sheets

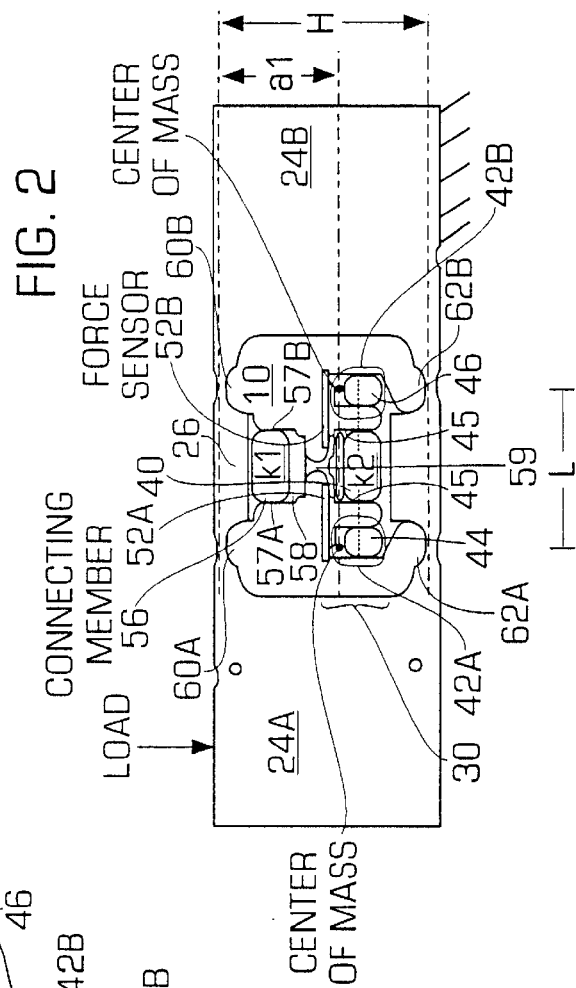
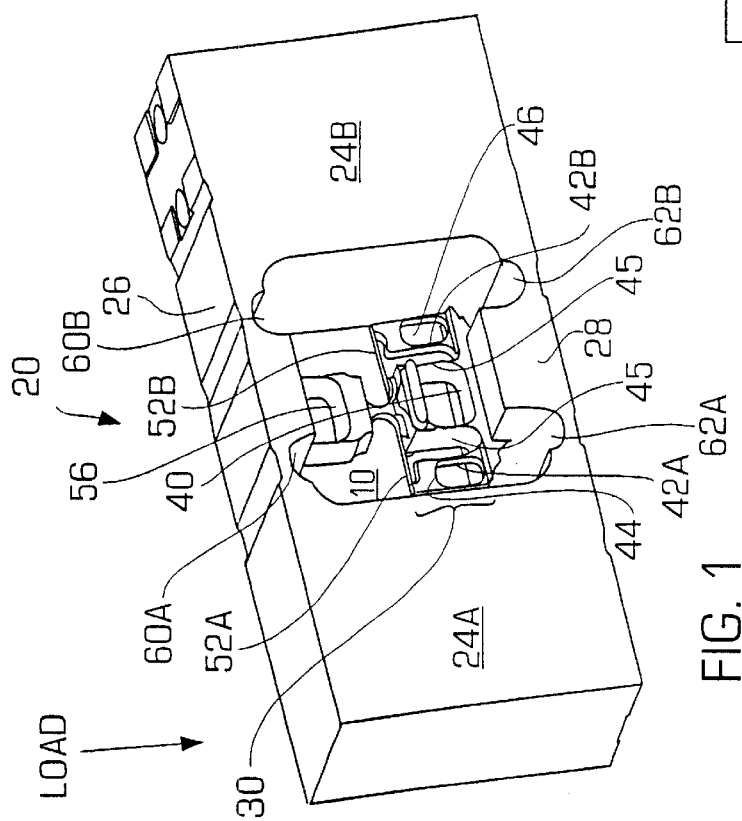

ELECTRONIC FORCE SENSING SHOCK RESISTANT LOAD CELL

FIELD OF THE INVENTION

This invention relates generally to a load cell for the measurement of force. More specifically, the invention relates to a load cell for the measurement of force resulting in strain or stress created by means such as, for example, force, acceleration, or pressure converting the force into an electronic signal transmitted to a point of computation or evaluation. The device resists shock and the damage from shock by resisting the generation of forces from the acceleration of internal masses in the direction of sensitivity on the sensing elements.

BACKGROUND OF THE INVENTION

Load measuring devices and cells are known in the art. For example, Johnson, U.S. Pat. No. 5,313,023 using force sensors within which move with the mass of the springs attached to them limiting the maximum tolerable acceleration. Gallo, U.S. Pat. No. 4,043,190, discloses a meter for measuring mass or force wherein the sensed displacement acts indirectly on the tension of the two transversely vibrating electrically excited strings with a pretension mass. Blawert et al, U.S. Pat. No. 4,237,988, similarly disclose an overload protection device for precision scales where the force sensing element is free to move from the deflection caused by the applied load. Paros, U.S. Pat. No. 4,384,495 discloses a mounting structure for double bar resonators to ensure symmetrical loading of the resonator responsive directly to external forces.

Further, Streater et al, U.S. Pat. No. 3,712,395, disclose a weight-sensing cell which includes two differentially loaded vibrating members where attached masses move with the members. The prior art load cells were dependent on the stability of the loaded structure, for output stability. For example, Albert, U.S. Pat. No. 4,838,369 discloses a load cell intended to provide a linear relationship between the signal generated and the force sensed. Albert relies on a longitudinally rigid structure to resist interference from varying load positions.

The force sensors in the above conventional load cells were sensitive to force. In particular, forces caused by acceleration of the masses attached to the force sensors would cause force on the sensors not limited by the deflection stop of the load cell. Any excessive accelerations due to impact to the load cell from rigid objects or the scale falling a distance (a shock) would cause the force sensors to be exposed to force beyond their maximum capacity causing the force sensor to fail. The load cell would be destroyed when a force sensor failed. Therefore, there exists a need for a load cell with impact resistant qualities and it is desirable to provide shock resistant electronic load cell and it is to this end that the present invention is directed.

SUMMARY OF THE INVENTION

In accordance with the invention, there is provided a force sensing load cell comprising a three-dimensional structure having an interior opening defined by an upper wall, a lower wall, and first and second side walls, a base affixed to the upper or lower wall within the interior opening of said three-dimensional structure, means for supporting capacity affixed to the base, a connection element attached to the opposite wall spaced apart from, and parallel in at least one plane to the means for supporting capacity and means for sensing force, the force sensing means affixed between the connection element and the capacity supporting means. The means for supporting capacity and the connection element function as springs. A spring is an element which may store energy through deflection when a force does work on the moveable portion of the spring and which may do work by returning stored energy by providing a force moving through a distance. Further embodiments may comprise more than one force sensing means affixed between any number of capacity supporting means and additional load bearing elements acting as springs parallel to the capacity supporting means attached to the connection element.

Reduced shock susceptibility is achieved by placing the center of mass of the movable end of the capacity supporting means attached to the force sensor nearly at or at a distance from the plane defined by the flexing axis of the opposite wall such that the movement of this mass due to load cell deflection is not in the direction of the axis of sensitivity of the sensor. This is achieved by matching the deflection in the direction of the axis of sensitivity of the sensor due to the load cell deflection of the load bearing elements and the capacity supporting means to that of the connection element in that direction due to the same effect. The relationship between the spring constants, flexure spacing, and position of null horizontal motion is defined by the equation:

$$a1 = \frac{H}{2} \cdot \left[\frac{k2-k1}{k2+k1} + 1\right]$$

Where a1 is the vertical position of null horizontal motion from the flexure, H is the vertical spacing between the flexures in the parallelogram, k1 is the connection members spring constant, k2 is the combined spring constant of the load bearing elements, and the capacity supporting means springs.

The above equation will provide a nearly optimum shock resistant load cell design unless the side walls are flexible or the scale support structure deflects. Adjust the spring constants and the null motion position from the theoretical values to optimize shock resistance in the final scale. Small variations from the calculated relationship will empirically optimize the design when the scale assembly survives maximum shock. Finite element analysis will also provide a close to optimum design of the load cell for a specific application. A substantial dead load on the load cell produces a deflection that may require an adjustment to allow maximum shock resistance under the desired loaded condition.

In accordance with one preferred aspect of the invention there is provided a force sensing load cell comprising a three-dimensional structure having an interior opening defined by an upper wall, a lower wall, and first and second side walls, a base affixed to the upper or lower wall within the interior opening of said three-dimensional structure, first and second capacity supporting cantilever beams affixed to the base and extending vertically within the plane of the interior opening, a load bearing cantilever beam affixed to the base between the capacity supporting cantilever beams and extending vertically within the plane of the interior opening parallel to the capacity supporting cantilever beams, a connecting cantilever beam attached to the opposite wall and extending vertically within the plane of the interior opening connected to the load bearing cantilever beam and parallel to the capacity supporting cantilever beams, and first and second electrical force sensors, the first force sensor affixed between the first capacity supporting cantilever beam and the load bearing cantilever beam, the second force sensor affixed between the second capacity supporting cantilever beam and the load bearing cantilever beam. Stress on the load cell from the incidence of a force stresses the two sensors oppositely. Independent signal processing of the first and second electrical sensor outputs produces independent mode signals separate from a differential mode signal and there is nearly no horizontal movement of the sensors due to vertical deflection of the load cell. Vertical impacts to the load cell do not cause the sensors to accelerate horizontally and induce horizontal forces on them as the masses attached to them accelerate.

In accordance with another preferred aspect of the invention there is provided a force sensing load cell comprising a three-dimensional structure having an interior opening defined by an upper wall, a lower wall, and first and second side walls, a base affixed to the upper or lower wall within the interior opening of said three-dimensional structure, a wall opening within said upper or lower wall opposite the base, first and second capacity supporting cantilever beams affixed to the base and extending vertically through the plane of the interior opening and into said wall opening, a load bearing cantilever beam affixed to the base between the capacity supporting cantilever beams and extending vertically across the plane of the interior opening parallel to the capacity supporting cantilever beams, a connecting member attached to the opposite wall connected to the load bearing cantilever beam, and first and second electrical force sensors, the first force sensor affixed between the first capacity supporting cantilever beam and the load bearing cantilever beam, the second force sensor affixed between the second capacity supporting cantilever beam and the load bearing cantilever beam. Stress on the load cell from the incidence of a force stresses the two sensors oppositely. Independent signal processing of the first and second electrical sensor outputs produces independent mode signals separate from a differential mode signal and there is nearly no horizontal movement of the sensors due to vertical deflection of the load cell. Vertical impacts to the load cell do not cause the sensors to accelerate horizontally and induce horizontal forces on them as the masses attached to them accelerate.

Preferably, the structure is machined monolithically from an isotropic metal, therefore, the modulus of elasticity is nearly homogeneous. There is nearly cancellation of the elastic modulus effect if the force sensor and its attachments are very stiff relative to the capacity supporting cantilever beams.

The cantilever beams should be designed for vertical load cell deflection to cause no horizontal motion of the material passing through the plane of the center of mass of the end of the capacity supporting cantilever beams attached to the force sensors.

BRIEF DESCRIPTION OF THE DRAWINGS

FIG. 1 is a perspective view of a shock resistant load cell in accordance with one preferred embodiment of the invention with two force sensors near the middle of the load cell opening;

FIG. 2 is a side plane view of the load cell shown in FIG. 1;

DETAILED DESCRIPTION OF A PREFERRED EMBODIMENT

The invention is particularly applicable to a load cell built from a monolithic block of material and it is in this context that the invention will be described. It will be appreciated, however, that the shock resistant load cell in accordance with the invention has greater utility, such as to other types of load cells that utilize force sensors. To understand the shock resistant load cell in accordance with the invention, the basic structure of the load cell and its force sensors will be described. Then, the properties of the load cell that make it shock resistant will be described and test results showing the shock resistance will be provided.

Load Cell Structure

Figure 5:
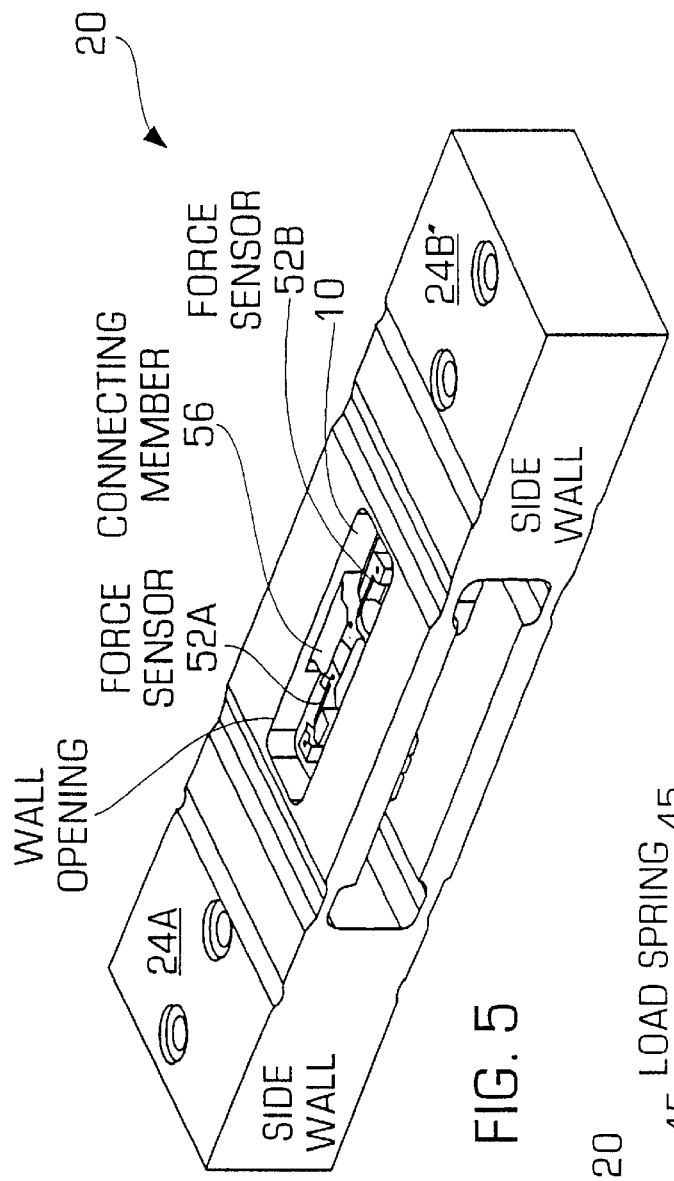
FIG. 5 is a perspective view of another preferred embodiment of a shock resistant load cell in accordance with the invention with two force sensors in an opening in the upper wall of the load cell.
Figure 6:
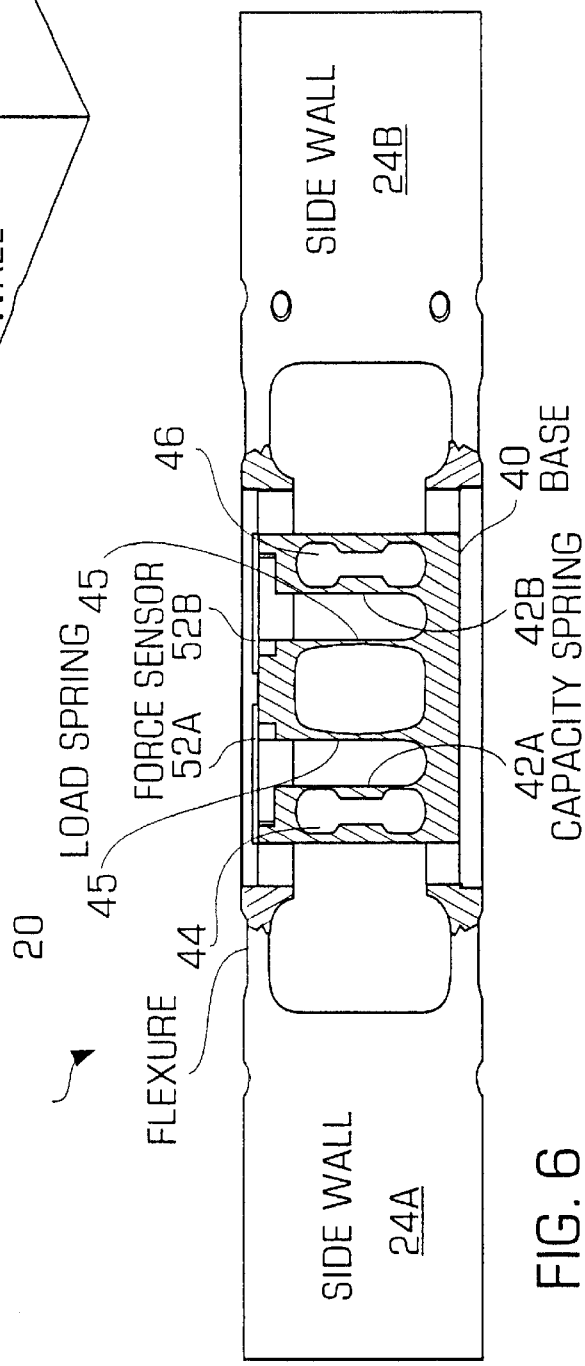
FIG. 6 is a side cut away sectional view of the shock resistant load cell depicted in FIG. 5.

Turning to the Figures wherein like parts are designated with like numerals throughout several views, there can be seen a force sensing load cell 20 in accordance with the invention shown in FIGS. 1 and 2 (the first embodiment) and FIGS. 5 and 6 (the second embodiment). The load cell may generally comprise a three dimensional structure having an opening 10 defined by an upper wall 26 and a lower wall 28, joined by first and second side walls, 24A and 24B, respectively. The load cell may include a fixed end corresponding to the second side wall 24B that is attached to a rigid support and a flexing end corresponding to the first side wall 24A onto which a force to be measured is applied as shown in FIG. 2.

The cell 20 generally comprises a base 40 positioned within the opening 10 and affixed to at least one of the opening walls. The load cell may include a lower portion 30 that includes one or more cantilever beams, one or more load beams and one or more force sensors as described below in more detail. In particular, affixed to the base is a first capacity supporting cantilever beam 42A which extends within the plane of said three-dimensional structural opening 10, as well as a second capacity supporting cantilever beam 42B spaced apart from, and parallel to the first capacity supporting cantilever beam 42A. In between the first and second cantilever beams, 42A and 42B, load beams 45 also are affixed to the base. Two sensors 52A, 52B are also affixed to the various beams in this embodiment of the invention. The first sensor 52A is affixed between the first capacity supporting cantilever beam 42A and the load beam 45. The second sensor 52B is affixed between the load beam 45 and the second capacity supporting cantilever beam 42B.

The load cell of FIGS. 1 and 2 further comprises a connecting member 56 that connects the lower portion 30 (that includes the force sensors 52A, 52B, the load beams 45 and the cantilever capacity supporting beams 42A, 42B) to the upper wall 26. As shown in FIGS. 1 and 2 which is a preferred embodiment, the connecting member 56 may further comprise a first and second spaced apart and substantially vertical arms 57A, 57B, connected to the upper wall 26, a base region 58 that connects the arms 57A, 57B and a bridge portion 59 that connects the base region 58 to the lower portion 30. The combined spring constant of the capacity supporting beams 42A, 42B and the load beams 45 are $K_2$ while the spring constant for the connecting member 56 is $K_1$. In the preferred embodiment, the load beam may have two arms that are spaced apart from each other and substantially parallel to form an opening as shown.

A fixed end 24B provides stationary positioning of all elements in the invention. The load cell flexing end 24A may, in accordance with certain embodiments of the invention, provide a support for receiving weight, force or other displacement from the load to be sensed. Among other functions, the support may also function as a platen or other surface for receiving the force which is to be analyzed. The base 40 is a rigid fixture to which the substantially parallel beams 42 and 45 are attached. The base 40 may be seen as a mounting plate for positioning of the load bearing means or load beam 45 with respect to the capacity support means 42. To this end, the base assists in positioning load beam 45 and cantilever support beam 42 parallel to each other within at least one plane as shown in FIGS. 1, 2 and 6.

Generally, the base 40 may comprise any number of designs and substances as long as a certain vertical flexibility through flexures 60A, 60B, 62A, 62B is provided. The base must be capable of deflection so as to convert forces on the flexing end to displacement of the parallel beams 42 and 45 attached within the base. Through this displacement, the parallel beams ultimately distribute stress and strain to the sensing means suspended between the two parallel beams. Preferably, the base comprises homogenous and isotropic metal. The load cell is defined as a unitary or monolithic structure wherein the base and parallel beam structures are molded as one continuous unit. This may be done through any number of means including machining, milling, ion cutting, casting or any other means known to those of skill in the art. Further, in the more preferred embodiments of the invention (FIG. 1), the load cell is preferably machined symmetrically and the spring constants of the beams matched. To this end, the response of the sensing elements should be matched as closely as possible. Further, the load cell may be adjusted by stressing the load cell, gauging the response and relieving excess material from the stressed cell to equalize the response. Preferred compositions include metals such as, for example, elemental metals and metal alloys. Metal compounds including aluminum and its alloys such as 2024-T3, 7075-T6, and 1100; copper and its alloys including ASTM B147, ASTM B145, and ASTM B146; zinc and its alloys including ASTM A40A, and ASTM AC41A, as well as any other metals that are known to provide a light weight structure having good resilience to the forces intended to be sensed by the cell. Most preferably, metals such as aluminum and its oxides are used in forming the load cell of the invention but almost any structural material which lends itself to manufacturability may be used. The load cell may also be made from polymer systems which provide uniform material characteristics, that is modulus, temperature sensitivity, expansion characteristics, etc. Plastics such as polyamides, polyamide-imides, polyvinyl chloride, polyethylene, propylene, polycarbonates, aminoplasts such as melamine resins, cast epoxy resins, cast epoxy resins, cast acrylics, cast fluoroplastics, phenolics, polyacrylonitriles, cast polyurethanes, cast polyesters or polyolefins; synthetic or natural rubber polymers and copolymers such as silicones; ceramics such as silicon dioxide; and cellulosic products; or mixtures of any of these compounds.

As applied in a load cell, the base 40 may be used to position cantilever support beams 42A, 42B and load beams 45 in the opening 10 of the load cell structure 20. More specifically, the base 40 extends generally and is attached to a wall 28 which forms the load cell opening 10. While not essential, the load cell base 40 may be attached to interior wall 28, or for that matter any of the other interior walls including side wall 24A, side wall 24B or upper wall 26 through any number of appendages including flexures 60A, 60B, 62A, 62B.

The load cell of the invention generally also comprises a parallel beam structure which assists in the measure of force incident to the load cell. The parallel beam structure 42 and 45 also functions to hold the sensing means 52. Generally, the parallel beam structure may comprise any configuration of the appropriate material and dimension which will facilitate and exhibit deflection under the intended conditions.

The definition of parallel beams 42 and 45 will depend on the magnitude of the force, acceleration or other movement to be sensed by the beam structure. Relevant parameters include the length of the parallel beams, the necessity of the beam in having an opening 44 and 46, FIG. 6. Also relevant are the materials used to create the beams and the presence of flexures to attach the beams to any intended base. Generally, the parallel beam structure may comprise any number of different configurations in accordance with the invention. One alternative embodiment of the parallel beam structure can be seen in FIG. 6 comprising parallel beams 42 and 45. In this instance, parallel beam 45 serves as a load beam, being a primary support of any mass, force, or other displacement placed in the structure. In the meantime, capacity supporting beam 42 serves as means for supporting the capacity sensors affixed to this lower beam 42. In other words, beam 42 will receive the measured force resulting from displacement. In the meantime, beam 45 serves as a load bearing element as well as an additional station to seat sensing element 52.

This configuration produces a load cell which is easily manufactured to provide a uniform response regardless of where force is applied generally across the surface of the flexing end 24A. Further, the parallel beam structure, including the close proximity of the beams to one another, provides a structure wherein changes in temperature, humidity, as well as other environmental stresses result in beams which respond similarly to one another. In essence, the invention provides a force sensor which compensates for changes in modulus and allows for any variation and deflection created by environmental stresses.

A more preferred embodiment of the invention can be seen in FIGS. 1 and 6 wherein load bearing member 45 is positioned parallel, within the opening of the three dimensional structure or block, to cantilever beam 42 or the capacity supporting means. Here again, the base 40 has an interior plane which is parallel to the interior side of the sensor 52. At the same time, the overall configuration of cantilever beam 42 is parallel at its interior edge with the interior or opposing face of load beam 45.

While not essential, openings 44 and 46 may be defined in each of the cantilever beams 42A, 42B and load beams 45, respectively. These openings allow greater sensitivity to force allowing for the load beam deflection to be created by a preferred magnitude of force. In essence, openings such as those found at 44 and 46 allow for the creation of a load cell having greater adjustment to the force incident on the cell. The openings are easily bored or machined with standard tooling, and may be slotted (See FIG. 2) or dumbbell-shaped (See FIG. 6).

Generally, as can be seen in FIGS. 1 and 6, a load cell may take any number of configurations including that of a three-dimensional six-sided block. Within the cell, there may generally be an opening 10 defined by the two side walls 24A and 24B as well as an upper side wall 26 and a lower side wall 28 positioned within the opening is the base 40 on which is mounted load beam 45 and cantilever capacity supporting beam 42. Optionally, any number of elements within the load cell may be attached through the use of flexures. Flexures assist in determining the load capacity of the parallel beam structure as well as preventing the base or other structures from pivoting or bending into a plane outside that intended. Flexures are integral in converting the force sensed into displacement of the base and parallel beam structure so as to influence the sensor by a mechanical action ultimately resulting in a transduced signal from the sensor.

Generally, flexures may be positioned anywhere within the load cell to prevent interfering deflection. Specifically, as can be seen in FIG. 2, a flexure 62A or 62B may be found at the ends of lower wall 28 attaching lower wall 28 to side walls 24A and 24B. A flexure 60A or 60B may be found at the ends of upper wall 26 attaching upper wall 26 to side walls 24A and 24B.

Within the opening of the three-dimensional structure, sensing element 52 is supported between load bearing beam 45 and capacity supporting beam 42. Load beam 45 and cantilever support beam 42 are in parallel within at least one plane within the opening 10 of three-dimensional block 20. This maintains the parallelogram-like structure created by base 40, sensing element 52, as well as the two interior or opposing side walls of beam 42 and beam 45. Accordingly, deflection of the load cell by any force will result in a parallelogram-like response within the invention.

The sensors may be attached through means which will provide an integral or fixed and stable joint such as thermoplastic or thermosetting adhesives. One preferred class of adhesives includes epoxy-type adhesives, such as those commercially available. Preferred load cell performance may be as rigid and stable as possible. To minimize joint effects a larger deflection of the parallel spring system is desired. Then when the attachment joints move, this movement is small relative to the beam deflection. The output will then be less sensitive to a small amount of deflection due to less than perfect attachment joints.

The load cell of the invention also comprises sensing means 52. The sensing means generally function to sense force created by the incidence of a force on the load cell. The sensing means is influenced by the force either of compression or tension and transduces this force into an electrical signal which is sent to a circuit for evaluation. Generally, any number of sensing means may be used in accordance with this invention including hard electrical wiring, electrical circuitry, transistor circuitry, including semiconductors and the like. Sensing means which may be used include optical, electromechanical, and impedance or resonator sensing means.

One preferred sensing element comprises an impedance or resonator such as a quartz crystal. Preferred resonators include those available from Microcrystal made by ETA of Grenchen, Switzerland. This resonator is commonly referred to as a double ended tuning fork and generally comprises two parallel tines joined together at their ends. The tines are excited piezoelectrically so as to vibrate in an amount bending them in opposition to each other within the plane of the plate. By applying a tensile or compressive force to the crystal along its longitudinal axis, its resident frequency will increase or decrease like the strings of a violin.

The quartz crystal is a very stable and reliable electromechanical device. Its force frequency response and its quasidigital output signal associated with accurate frequency measuring capabilities enable good performance. Outstanding mechanical and physical properties of single crystal quartz yield a behavior with tight repeatability and without hysteresis as well as good thermal and long term stability. Furthermore, only small displacements are induced in the mounting structure due to the high stiffness of quartz.

An oscillator is needed in order to drive the quartz resonator. Since equivalent electrical parameters of the crystal are similar to those of the widely used tuning forks, familiar pierce oscillators known to those of skill in the art are adequate for operation of the crystal. Oscillators using standard integrated amplifiers are easy to implement. A useful oscillator circuit may be supplied by 5 to 15 volts through any variety of circuit configurations known to those of skill in the art.

Preferably, the quartz crystal transducer will range in size from about 0.1 inch to 1.0 inch, and most preferably from about 0.5 inch to 0.25 inch. The frequency range of the transducer may vary depending upon the given application. However a frequency of 20 KHZ to 100 KHZ, preferably 44 KHZ, 48 KHZ, and most preferably 86 KHZ to 94 KHZ has been found most useful.

The load cell of the invention may also comprise any variety of circuitry useful in evaluating the electrical signal received from the sensing means and reflecting the appropriate magnitude of the sensed force. Generally, any circuit commensurate with this purpose which will provide a linear response to an electrical signal may be used in accordance with the invention.

Preferably, circuitry found useful with this invention are impedance circuits such as Wheatstone bridge configurations and the like, or differential circuits which cancel the bias signals of the elements within the load cell. The Wheatstone bridge uses four resistive elements arranged in a square circuit with voltage applied across two diagonal corners and the signal measures across the other diagonal corners.

Returning to FIG. 1, a more preferred embodiment of the parallel beam structure can be seen. Essentially, this embodiment of the load cell may function with two sensing elements 52A and 52B, a base 40, and adequate structure to ensure that both sensing elements will be influenced equally and oppositely when the load cell is stressed. This will allow for the independent signal processing of each respective sensor producing a common mode signal effects and differential mode signal effects.

Common mode signal effects include the effects of temperature, pressure, external vibration and aging among any other effects which influence both cantilever beams 42A and 42B as well as sensors, 52A and 52B, equally. Differential mode effects are most importantly any force or stress on the sensor which influences the cantilever beams 42A and 42B as well as sensors 52A and 52B, unequally. In this case, hollowed cantilever beams 42A, 42B and 45 are attached to a single unitary/base 40 stemming from the opening lower side 28. The load cell is able to compensate for changes in the modulus of elasticity, variations and hysteresis as well as anelastic creep through attachment of both of the flexible beams 42A and 42B through sensing means 52A and 52B attached between the upper ends of the flexible beams and the load beam 45. In this instance, any change in modulus, hysteresis or creep will be cancelled by attaching the sensing means between both flexible arms and the load beam as both will be affected proportionally.

Operation of Shock Resistant Load Cell

As with typical load cells, the shock resistant load cell, the load cell is fixed to a rigid support on one end and a force to be measured is applied to the other as shown in FIG. 2. The load cell deflects a small distance under the influence of the applied force. This deflection causes the upper wall 26 to rotate about the center of the upper flexure 60B on the fixed end and the lower wall 28 to rotate about the center of the lower flexure 62B on the fixed end. The end of the connecting member 56, attached to the upper wall 26 then also rotates about the upper flexure 60B. The general movement has a vector component in the horizontal as well as the vertical direction to define the rotation. Similarly the base 40, capacity supporting cantilever beams 42A, 42B, and the load beams 45 rotate about lower flexure 62B. This general movement also has a vector component in the horizontal as well as the vertical direction to define the rotation. The deflection is small, and the connection member 56 is at the same horizontal distance between the upper flexures 60A and 60B as the load beam 45 is between the lower flexures 62A and 62B. The vertical movement of the two is then the same and the attachment between them maintains this condition during load cell deflection ΔY. Without deflection of the connecting member 56, the vertical and horizontal distances define the horizontal movement of the inner end of it relative to that of the load cell. The connecting member 56 is a predetermined vertical distance from the fixed end upper flexure 60B and has a predetermined horizontal movement during a deflection. The load beam 45 is a similar vertical distance from the fixed end lower flexure 62B in a opposite direction and has a similar horizontal movement which is in the opposite direction of the connection member. These two horizontal movements are opposite and cause the connected load beam 45 and connecting member 56 to deflect in order to remain connected at their inner ends. "L" represents the horizontal distance between the two upper flexures 60A, 60B and that between the two lower flexures 62A, 62B as shown in FIG. 2. "H" represents the vertical distance between the two fixed-end flexures 60B, 62B and between the two deflecting-end flexures 60A, 62A. The differential horizontal deflection ΔX of these two inner connected springs is defined by the equation:

$$\Delta X = \Delta Y \cdot \frac{H}{L}$$

A point a1 down from the upper flexure 60A, 60B as shown in FIG. 2, where no horizontal movement occurs is defined by:

$$a1 = \frac{H}{2} \cdot \left[\frac{k2 - k1}{k2 + k1} + 1\right]$$

Where k1 is the connection member's spring constant, k2 is the combined spring constant of the load bearing elements, and the capacity supporting means springs.

When k2=k1, a1 is equal to ½ of H. This relationship is shown in FIGS. 1 and 2 which is a first embodiment of the shock resistant load cell. As k1 becomes very stiff, a1 approaches zero. This embodiment of the shock resistant load cell is shown in FIGS. 5 and 6 which is another embodiment of the invention. As k2 becomes very stiff, a1 approaches H. The general solution is usual and requires measurement of the horizontal movement of the center of mass of the deflecting end of the capacity beams 42A, 42B. The center of mass of these capacity beam ends does not move horizontally when they have vertical distances, a1, from the upper flexures 60A, 60B. The force sensors are very stiff in their direction of sensitivity and have limited force range. The force sensors connect the mass of the capacity beam 42A, 42B ends to the inner end of the load beam 45.

Figure 3:
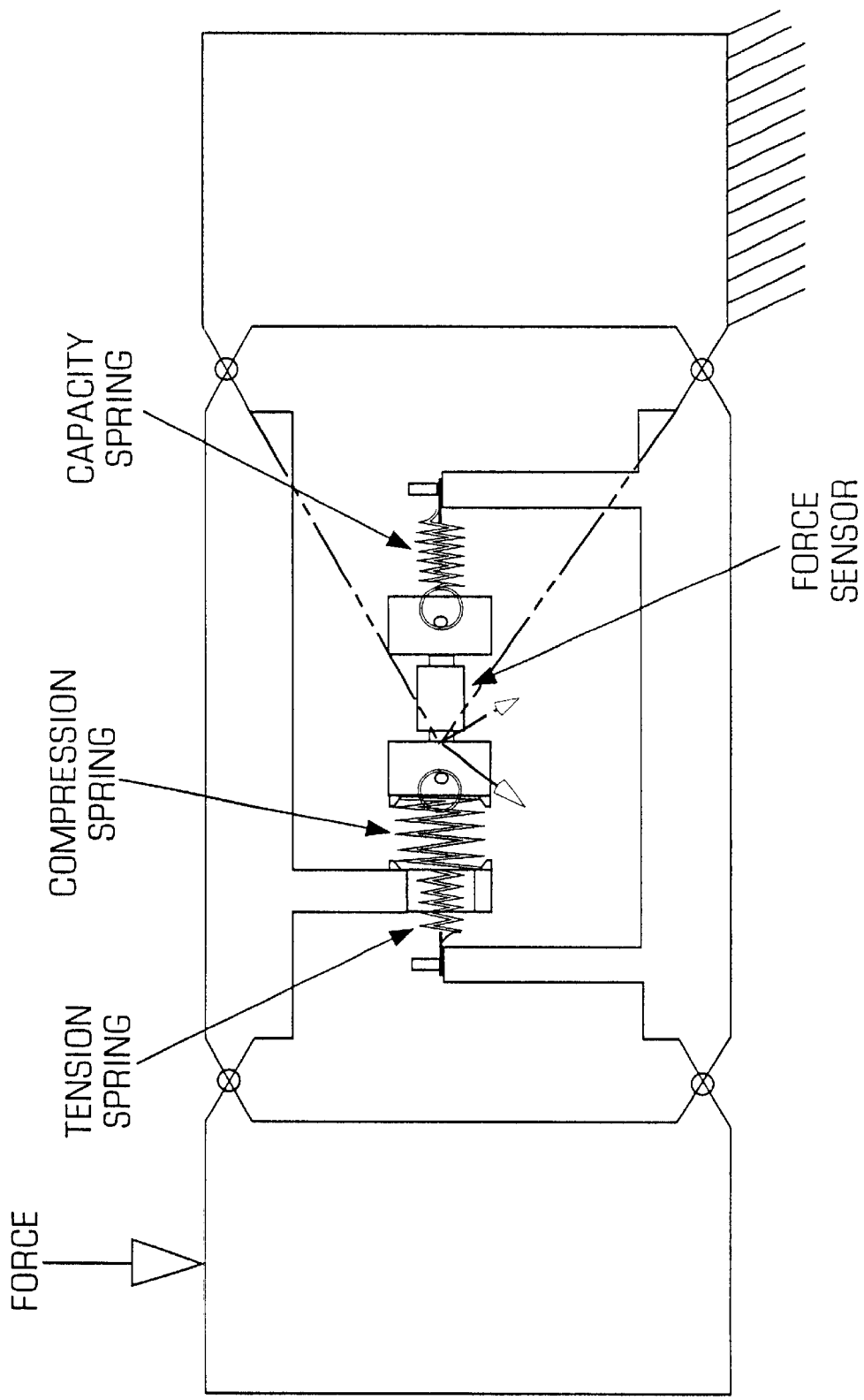
FIG. 3 is a side plane view of a conceptual spring model of a shock resistant load cell with only one force sensor located near the center of the load cell in accordance with another embodiment of the invention.
Figure 4:
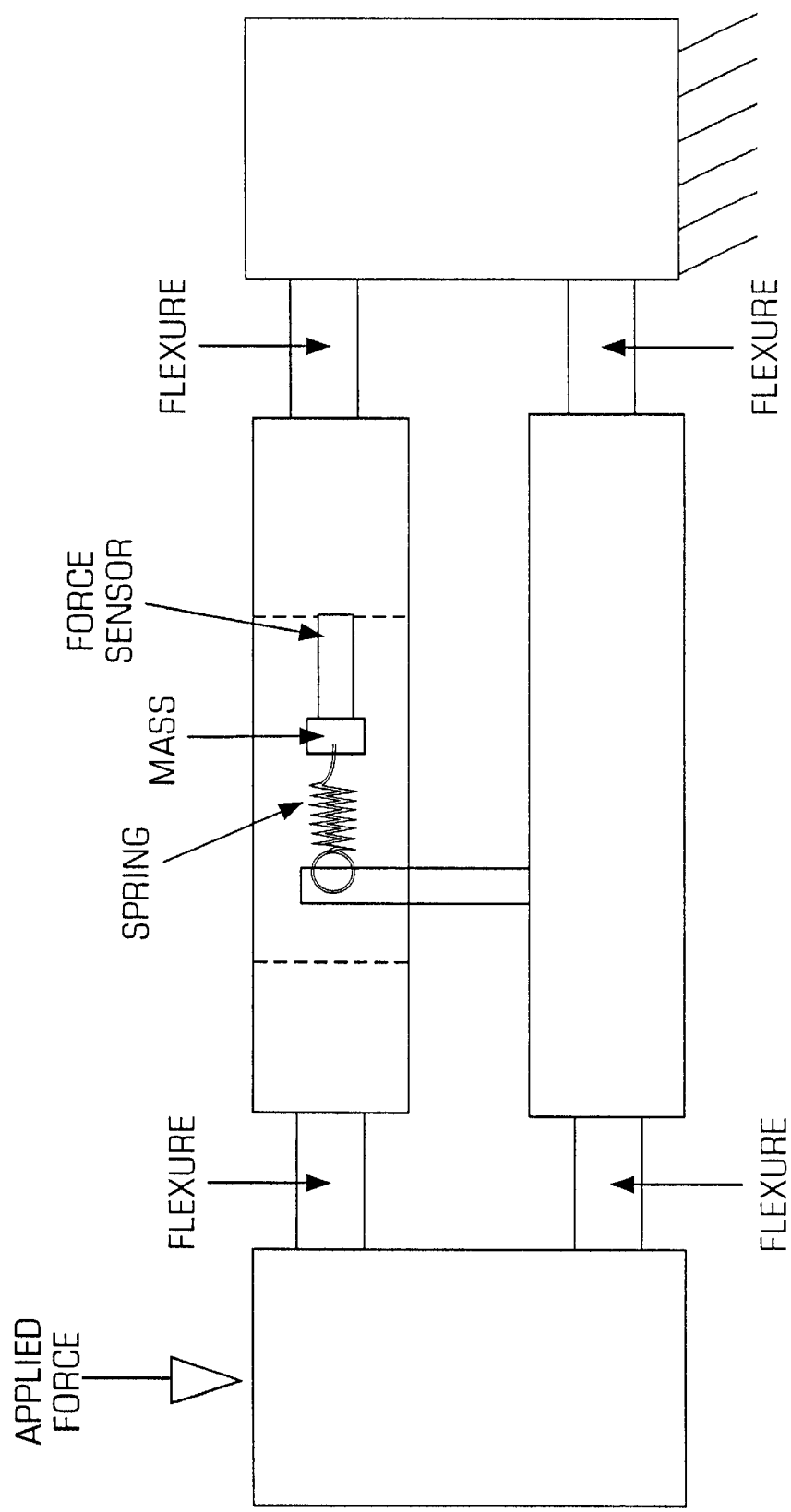
FIG. 4 is a side plane view of a conceptual spring model for a shock resistant load cell in accordance with the another embodiment of the invention with only one force sensor in an opening in the upper wall of the load cell with no load beam.

During acceleration due to shock, additional force from the force sensors must be provided to accelerate these masses, if they move in their direction of sensitivity. Vertical and side accelerating forces are provided by the relatively vertically and laterally stiff beams themselves. FIG. 3 indicates the opposing spring arrangement between the load spring and the connecting spring. This may illustrate more intuitively how one spring deflecting in compression may cancel another's deflection in tension. FIG. 4 indicates the simplest form of the invention, where the total of the spring forces on the bottom is solely represented by the capacity beams (one shown with one force sensor). This load cell has capacity limited by the load bearing capacity of the flexured parallelogram and the levered capacity beams.

While not wishing to be bound to a specific mode or theory of operation, we believe that the load cell has a load bearing beam 45 arranged with a bridging gap to a small spring 42. This small spring 42 bears a load because of the deflection of the load bearing beam 45 by force transfer through a relatively ridged force sensor 52A or 52B deflecting only for example about 0.000005 inch at full load. In this case, the entire load cell may deflect only about 0.015 inch. The force sensor then experiences a force which is independent of the elastic modulus of the machining material.

In this case, where P is load, the total load born by the parallel springs is:

$$PT = P_1 + P_2$$

where $P_1$ is the load born by beams 45, member 56 and flexures 60 and $P_2$ is the load born by spring 42.

The load on each beam is proportional to its deflection:

$$P_1 = K_1 Y_1$$

and $$P_2 = K_2 Y_2$$

where $Y_1$ and $Y_2$ are respective deflections in inches, $K_1$ and $K_2$ are respective spring constants representing pounds of load per inch of deflection.

If the connecting force sensor has a very high spring constant then the two beams have nearly equal deflection under load.

$$Y_1 = Y_2 \text{ and } \frac{P_1}{K_1} = \frac{P_2}{K_2}$$

The spring constant of each beam is proportioned to the modulus of its material of composition:

$$K_1 = C_1 E_1$$

and $$K_2 = C_2 E_2$$

where $C_1$ and $C_2$ are constants dependent on the beam shapes and $E_1$ and $E_2$ are their respective elastic moduli.

Because the material of both springs is the same, their moduli are the same.

$$E_1 = E_2$$

and $$\frac{P_1}{C_1 E_1} = \frac{P_2}{C_2 E_1}$$

The force on $P_2$ is equal to the force on the force sensor because the force sensor is the connecting element. Therefore the sensed force is proportional to the applied load.

$$P_2 = \frac{P_1 C_1}{C_1} = (P_T - P_2) \times \frac{C_2}{C_1}$$

and $$P_2 = \frac{P_T}{(1 + C_2/C_1)}$$

$C_2$ and $C_1$ are dimensional factors so $P_2$ is directly dependent on the applied force without substantial modulus effects.

Therefore, modulus sensitivity to temperature, anelastic creep (a time dependent modulus effect) and static hysteresis (an internal material friction effect which creates a history dependence on modulus) become negligible if the structures in both springs see similar environmental effects and stress levels if a nonlinear stress-strain relationship exists.

The output signal of these load cells is almost purely dependent on their structural dimensions and the applied load, if temperature does not effect the force sensor's performance. When the load cell is not made from the same material as the force sensor, temperature changes will cause a change in the force sensors signal in the form of a zero shift. Other environmental effects such as barometric pressure may also cause similar effects on the zero stability. To overcome these environmental effects a closely matched second force sensor is generally preferred. The second force sensor 52B may be mounted between the load beam 45 and another parallel beam 42B. This force sensor will then see a negative force as compared to the first sensor 54A. By extracting the difference between the two force sensors, the output due to the applied force is doubled, but interference effects which affect both sensors 52A and 52B equally cancel.

Summary of Shock Resistant Testing Results

Below are the results of the shock resistance testing performed on the shock resistant load cell in accordance with the invention. The testing of the shock resistant load cell reveals an improvement of over 6 times greater impact resistance from the prior art scales using similar force sensors and load cells. The scales made with the shock resistant load cells in accordance with the invention met the Scale Manufactures Shock and Overload standards for extreme application.

For a typical scale that does not use the shock resistant load cell, one-half of capacity on the scales was dropped from a height of six inches in any location on the load-bearing platform and it produced no damage. However, in some scales, at greater heights—than this, the scales failed and required repair due to failure of the force sensors. Other tests with more severe impacts from harder objects also caused failure. The dropping of the scale could also typically cause failure. However, scales tested with the claimed shock resistant load cell in them displayed weight correctly even after the same one-half of capacity weight was dropped from a height of 48 inches. Further, more abuse of the scale itself by dropping it from over six inches and up to 12 inches on to a hard surface from any direction did not damage the scale or cause faulty functioning afterwards. In some conditions the scales with the claimed shock resistant load cell displayed resistance to shock levels that were over nine times greater than prior art scales. When 11 test scales were placed in severe applications where load cell failures had occurred weekly, no failures had occurred yet after 12 weeks of severe use.

The tests performed on the shock resistant load cells in accordance with the invention included dropping 25 kg from 36" which did not break a 50 kg 2.5" high Quartzell transducer. The tests also included dropping a 0.5-kg steel ball from 7 feet directly on to the load bridge which did not break the crystals. In addition, a 12" scale was dropped flat on its feet without damage, a scale was dropped on its sides from 6" without breakage and the front and back of the scale were dropped as far as possible without lifting the other side without breakage. In another test, continuous unsupervised abuse with a 25 lb weight on a 50 kg scale did not break the load cell but damaged the outer scale structure which was repaired and the scale still functioned accurately. Thus, a scale with a shock resistant load cell in accordance with the invention provides orders of magnitude greater shock resistance that typical load cells.

Applications

The claimed invention may be used in any force sensor application where a mass is attached to the active end of the force sensor. The arrangement transforms the direction of the applied force perpendicularly from its original direction with a parallelogram. The magnitude of the applied force is divided to a level acceptable to the force sensor through parallelogram flexure spacing and parallel springs. The sensed force is therefore no longer due to deflection in the direction of the applied load and produces no motion of the force sensor or the masses attached to it with the proper series spring arrangement.

These load cells may be used where shock is probable as in unsupervised and unsympathetic weighing of indeterminate objects by unknown individuals. They will serve in general purpose scales available for public use, pay scales, scales sold as retail products, and in scales used in sever applications where objects are dropped on to the scale from a distance. The load cells can be used for the measurement of force where the force bearing member is suddenly released, as in the destructive testing of materials.

The above discussion, examples and embodiments illustrate our current understanding of the invention. However, since many variations of the invention can be made without departing from the spirit and scope of the invention, the invention resides wholly in the claims hereafter appended.

While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A shock resistant load cell, comprising:
   a load cell body having a top surface and a bottom surface;
   a load beam assembly connected to the load cell body at the bottom surface;

a connecting member assembly connected to the load cell body at the top surface;

a force sensor connected between the load beam assembly and the connecting member assembly that measures the force applied to the load cell body; and the connecting member assembly having a first spring characteristic, $k_1$, and the load beam assembly having a second spring characteristic, $k_2$, wherein the position and spring characteristics of the load beam relative to the position and spring characteristic of the connecting member within the load cell body reduces the motion induced in the force sensor during a shock.

2. The load cell of claim 1, wherein, during a shock, the load beam assembly moves in a predetermined horizontal direction and the connecting member assembly moves in a predetermined horizontal direction opposite to the load beam assembly so that the motions of the load beam assembly and the connecting member cancel each other out and the shock does not damage the force sensor.

3. The shock resistant load cell of claim 2, wherein the position and spring characteristic of the load beam assembly and the position and spring characteristic of the connecting member assembly are related by:

$$a1 = \frac{H}{2} \cdot \left[ \frac{k2-k1}{k2+k1} + 1 \right].$$

4. The shock resistant load cell of claim 2, wherein the load beam assembly further comprises a first capacity supporting beam and a second capacity supporting beam spaced apart from each other and a load beam in between the first and second capacity supporting beams.

5. The shock resistant load cell of claim 4, wherein the capacity supporting beams and the load beam are cantilever beams.

6. The shock resistant load cell of claim 4, wherein each capacity supporting beam comprises a first capacity supporting arm and a second capacity support arm spaced apart from each other to form a cutout in the capacity supporting beam.

7. The shock resistant load cell of claim 4 further comprising a first force sensor connected between the first capacity supporting beam and the load beam and a second force sensor connected between the second capacity supporting beam and the load beam wherein the first force sensor is compressed while measuring a load and the second force sensor is tensioned while measuring a load.

8. The shock resistant load cell of claim 4, wherein the connecting member assembly further comprises a first connecting arm connected to the load cell body and a second connecting arm connected to the load cell body and spaced apart from the first connecting arm and a base region to which the first and second connecting arms are connected wherein the base region connects to the load beam.

9. The shock resistant load cell of claim 4, wherein the center of mass of the capacity supporting beams is located substantially near the center of the load cell body.

10. The shock resistant load cell of claim 9, wherein $k_1$ is approximately equal to $k_2$.

11. The shock resistant load cell of claim 4, wherein the first spring characteristic $k_1$ of the connecting member assembly is large so that the center of mass of the capacity supporting beams is located near the upper wall of the load cell body.

12. The shock resistant load cell of claim 7, wherein the force sensors each comprise a piezoelectric resonator.

13. The shock resistant load cell of claim 7, wherein each force sensor comprises a piezoelectric quartz resonator comprising a first tine and a second tine lying parallel to each other and attached at their ends.

14. A force sensing load cell comprising:

a three-dimensional structure having an interior opening defined by an upper wall, a lower wall, and first and second side walls;

a load beam assembly connected to the lower wall;

a connecting member assembly connected to the upper wall;

a force sensor connected between the load beam assembly and the connecting member assembly that measures the force applied to the load cell body; and the connecting member assembly having a first spring characteristic, $k_1$, and the load beam assembly having a second spring characteristic, $k_2$, wherein the position and spring characteristics of the load beam relative to the position and spring characteristic of the connecting member within the load cell body reduces the motion induced in the force sensor during a shock.

15. The load cell of claim 14, wherein, during a shock, the load beam assembly moves in a predetermined horizontal direction and the connecting member assembly moves in a predetermined horizontal direction opposite to the load beam assembly so that the motions of the load beam assembly and the connecting member cancel each other out and the shock does not damage the force sensor.

16. The shock resistant load cell of claim 15, wherein the position and spring characteristic of the load beam assembly and the position and spring characteristic of the connecting member assembly are related by:

$$a1 = \frac{H}{2} \cdot \left[ \frac{k2-k1}{k2+k1} + 1 \right].$$

17. The shock resistant load cell of claim 15, wherein the load beam assembly further comprises a first capacity supporting beam and a second capacity supporting beam spaced apart from each other and a load beam in between the first and second capacity supporting beams.

18. The shock resistant load cell of claim 17, wherein the capacity supporting beams and the load beam are cantilever beams.

19. The shock resistant load cell of claim 17, wherein each capacity supporting beam comprises a first capacity supporting arm and a second capacity support arm spaced apart from each other to form a cutout in the capacity supporting beam.

20. The shock resistant load cell of claim 17 further comprising a first force sensor connected between the first capacity supporting beam and the load beam and a second force sensor connected between the second capacity supporting beam and the load beam wherein the first force sensor is compressed while measuring a load and the second force sensor is tensioned while measuring a load.

21. The shock resistant load cell of claim 17, wherein the connecting member assembly further comprises a first connecting arm connected to the load cell body and a second connecting arm connected to the load cell body and spaced apart from the first connecting arm and a base region to which the first and second connecting arms are connected wherein the base region connects to the load beam.

22. The shock resistant load cell of claim 17, wherein the center of mass of the capacity supporting beams is located substantially near the center of the load cell body.

23. The shock resistant load cell of claim 22, wherein $k_1$ is approximately equal to $k_2$.

24. The shock resistant load cell of claim 17, wherein the first spring characteristic $k_1$ of the connecting member assembly is large so that the center of mass of the capacity supporting beams is located near the upper wall of the load cell body.

25. The shock resistant load cell of claim 20, wherein the force sensors each comprise a piezoelectric resonator.

26. The shock resistant load cell of claim 20, wherein each force sensor comprises a piezoelectric quartz resonator comprising a first tine and a second tine lying parallel to each other and attached at their ends.

* * * * *